United States Patent
Barnett et al.

(10) Patent No.: US 7,035,027 B2
(45) Date of Patent: Apr. 25, 2006

(54) CIRCUITS TO ACHIEVE HIGH DATA RATE WRITING ON THIN FILM TRANSDUCER

(75) Inventors: Raymond Elijah Barnett, Rosemount, MN (US); Tuan Van Ngo, Eden Prairie, MN (US); Scott Gary Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 543 days.

(21) Appl. No.: 09/974,281

(22) Filed: Oct. 9, 2001

(65) Prior Publication Data

US 2003/0067700 A1    Apr. 10, 2003

(51) Int. Cl.
*G11B 5/09*    (2006.01)
*G11B 5/02*    (2006.01)

(52) U.S. Cl. .......................................... 360/46; 360/68

(58) Field of Classification Search ................ 360/67, 360/46, 68; 327/108
See application file for complete search history.

(56) References Cited

U.S. PATENT DOCUMENTS

| | | | | |
|---|---|---|---|---|
| 5,386,328 A | * | 1/1995 | Chiou et al. | 360/68 |
| 5,754,059 A | * | 5/1998 | Tanghe et al. | 326/77 |
| 6,175,463 B1 | * | 1/2001 | Nayebi et al. | 360/68 |
| 6,297,921 B1 | * | 10/2001 | Price et al. | 360/68 |
| 6,429,987 B1 | * | 8/2002 | Cheng | 360/46 |
| 6,567,228 B1 | * | 5/2003 | Bhandari et al. | 360/67 |

OTHER PUBLICATIONS

Sedra, Adel S. and Smith, Kenneth C., Microelectronic Circuits, 1998, Oxford University Press, Fourth Edition, pp. 1195-1200.*
Sedra, Adel S. and Smith, Kenneth C., Microelectronic Circuits, 1998, Oxford University Press, Fourth Edition, pp. 1195-1200.*

* cited by examiner

*Primary Examiner*—David Hudspeth
*Assistant Examiner*—Daniell L. Negron
(74) *Attorney, Agent, or Firm*—W. Daniel Swayze, Jr.; W. James Brady; Frederick J. Telecky, Jr.

(57) ABSTRACT

The present invention covers circuits to achieve high data rate writing.

13 Claims, 3 Drawing Sheets

CIRCUITS TO ACHIEVE HIGH DATA RATE WRITING ON THIN FILM TRANSDUCER

FIELD OF THE INVENTION

The present invention is generally related to the field of mass media information storage devices, and more particularly to a drive circuit and method for increasing the write speed of a write driver.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by heads 16 which comprise a read head 18 and a write head 20 at the tip thereof. The conventional readhead 18 and writehead 20 comprise magneto-resistive heads adapted to read or write data from/to platters 12 when current is passed through them. Heads 16 are coupled to preamplifier 26 that serves as an interface between read/write heads 18/20 of disk/head assembly 10 and SSD channel 28. The preamp 26 provides amplification to the waveform data signals as needed. A preamp 26 may comprise a single chip containing a reader amplifier 27, a writer amplifier, fault detection circuitry, and a serial port, for example. Alternatively, the preamp 26 may comprise separate components rather than residing on a single chip.

To achieve high write speeds it is desired to provide a large voltage swing and a fast slew-rate current to the write head 120. A typical way to deliver a large voltage swing and fast slew-rate current via an interconnection to a thin film head is to use large CMOS levels and capacitors to boost the write driver's current and voltage. However, the disadvantages are that a large CMOS voltage swing (5V) causes too much power supply glitching, resulting in serious data pattern dependency and jitter. Currently, the most advanced write driver using CMOS-level switches can not operate over about 1.2 Gb/s.

Moreover, due to the flex cable interconnection between the preamplifier's write driver circuit and the thin film head, the current and voltage delivered to the thin film head are limited. Thus, a new write driver circuit is needed to overcome this problem so that data can be written at a higher data rates (1.2 Gb/s to 1.8 Gb/s).

SUMMARY OF THE INVENTION

The present invention achieves technical advantages by using ECL level logic throughout the write data path to achieve high speed data transfer. It also helps reduce transient voltage and current on supplies. The present invention uses NPN transistors and PMOS transistors switching in current mode for critical data switching path. Moreover, internal resistors of an H-switch are matched to the differential impedance of the flex cable interconnection to reduce the signal reflections, which affect the data integrity at high data rate. The present invention uses several emitter-follower stages to build up pre-drivers for the high current H-switch driver and to increase drive current slew rate.

ECL logic from 250 mV to 2V differential is a better way to transfer high speed data. In addition, the power dissipation is constant when using ECL logic, as compared to the power consumption of CMOS logic which increases with frequency. The advantagous use of PMOS current mode boost circuitry provides a fast slew rate current and large voltage swing at the preamplifier's outputs. Thus, high write data rates can be achieved without the need of expensive vertical PNPs (typically, five layers must be added to have the vertical PNPs). The present circuit provides a simple way to achieve write current accuracy.

DETAILED DESCRIPTION OF THE PREFERRED EMBODIMENT

The present invention implements an H-switch high current writer. However, the differences and advantages are the technique to provide ECL-level signals to the inputs of the H-switch rather than using CMOS logic.

Figure 2:
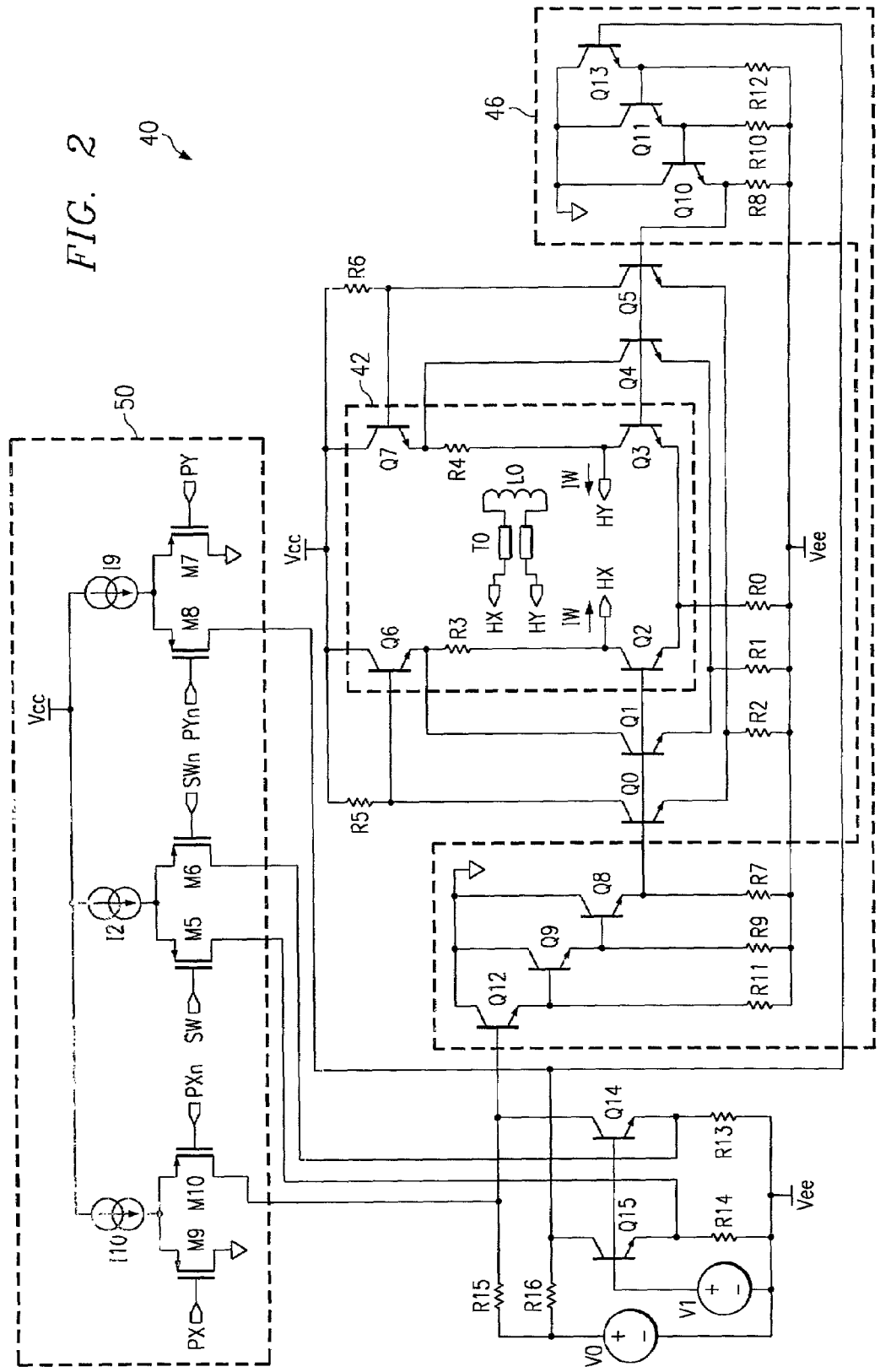
FIG. 2 depicts a schematic of a preferred embodiment of the present invention seen to include an ECL pre-driver circuit including emitter-follower transistors configured in multiple stages to build enough current and voltage drive capability for the high-current H-switch.

FIG. 2 shows the new write driver 40 including a pulsing circuit 50 and ECL buffers 46. An H-switch 42 write driver consists of transistors Q0–Q7 and resistors R0–R6. The operation of this H-switch 42 is described in copending patent application Attorney's Docket Number TI-31786 entitled "Method to Increase Voltage Swing and Reduce Rise Time of a H Current Switch." the teachings of which are incorporated herein by reference.

The ECL pre-driver 46 advantageously includes emitter-follower transistors Q8–Q13 and resistors R8–R12. Three stages of emitter-follower buffer are used to build enough current and voltage drive capability since the output write current Iw provided to the head L0 is typically 60 mA (steady state) and 150 mA (transient/overshoot).

The PMOS current mode logic boosting circuit 50 consists of three pairs of PMOS transistors switching in the pseudo ECL level i.e. 2V logic swing. The first pair of PMOS transistors M5 and M6 are used to switch the differential write data signal SW and SWn. In the second pair of PMOS transistors M9 and MI0 are used to switch the differential pulsing signal to create the write current overshoot differential signal across PX and PXn. In the third set of PMOS transistors M7 and M8 are also used to switch the pulsing signal in the other direction.

Figure 1:
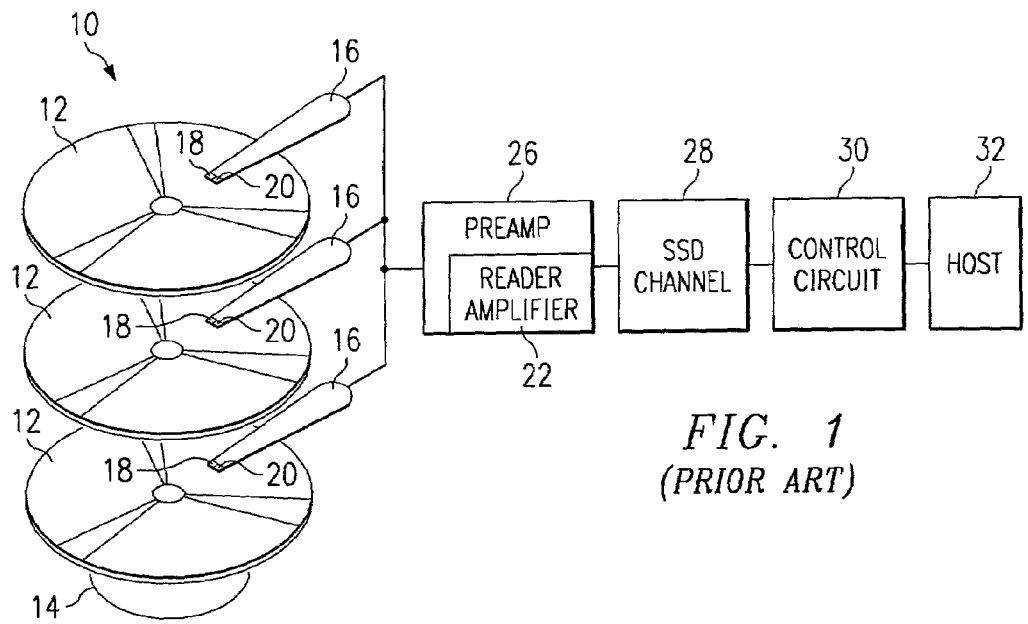
FIG. 1 illustrates a conventional disk drive system including multiple rotating disks or platters, read/write heads, a piezo actuator, a servo circuit, and associated amplifiers and control circuitry.
Figure 4:
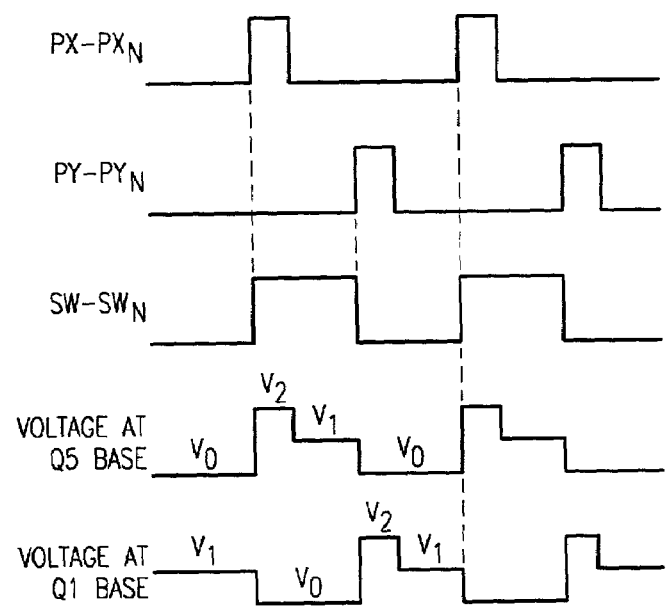
FIG. 4 is a waveform diagram illustrating key signals generated across the differential inputs of the three pairs of PMOS transistors switching in a pseudo ECL level logic swing.

FIG. 4 shows the differential waveform inputs provided by control circuitry (not shown) to the pulse-generating circuit 50 and the resulting outputs to the bases of transistors Q0–Q5 of the H-switch writer. Note that the rising edge of the (PX–PXn) signal and (PY–PYn) signal is coincident with the falling/rising edge of the write data signal (SW–SWn). Advantageously, the pulsing pulse width is determined by the write data delay signal. This delay time is programmable to achieve write current overshoot amplitude control.

Operation

Figure 3:
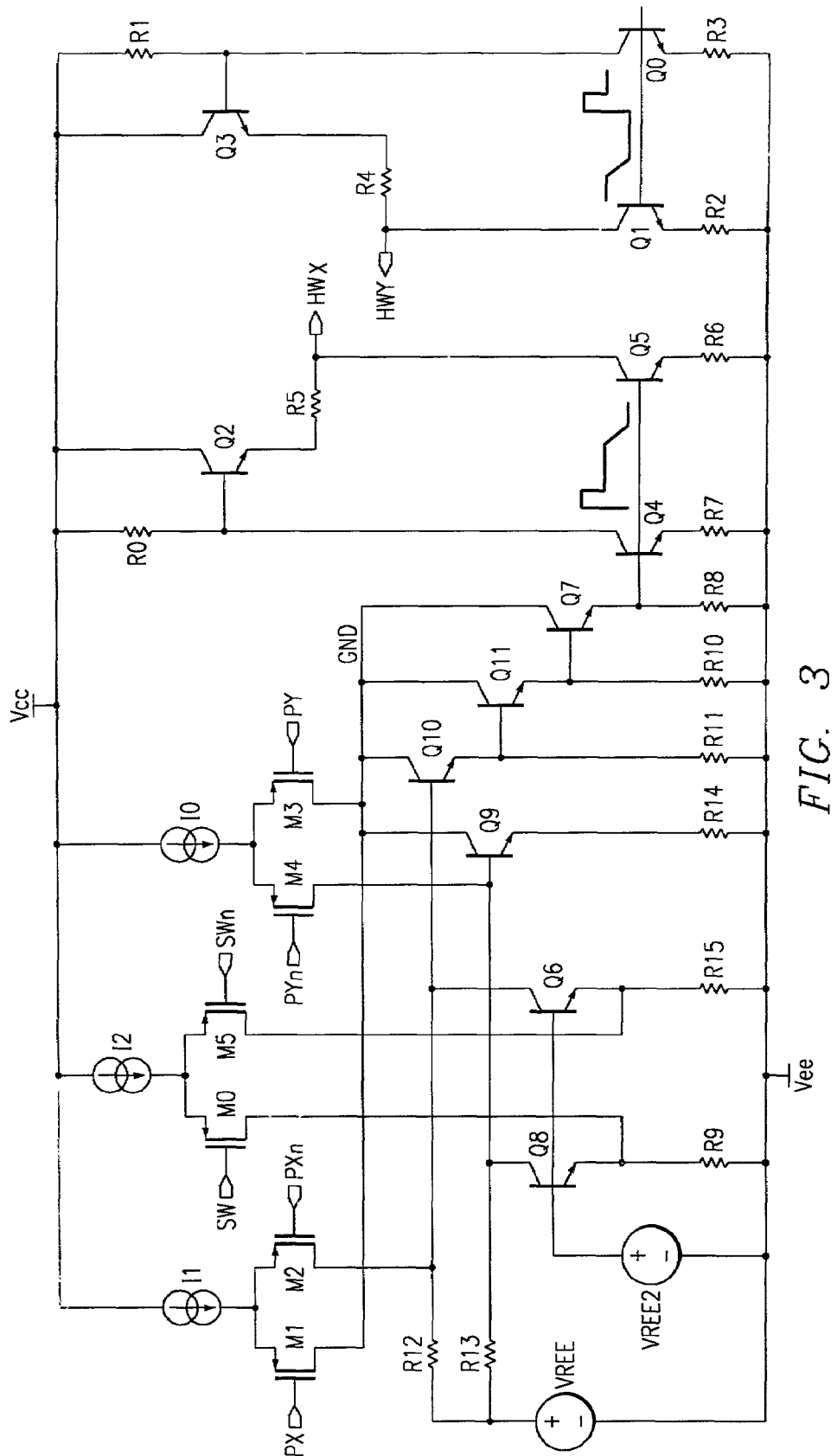
FIG. 3 is a simplified schematic of the circuit of FIG. 2.

Referring now to FIG. 3, the write data signal (2V logic swing) is converted into current by folding to the emitters of the current sources—Q8 and R9, and Q6 and RI5. All currents, including currents generating by the write data and pulsing currents, are converted to voltages at the bases of transistors Q9 and Q10. The current-to-voltage conversion is done through resistors R12 and R13, which are connected to voltage reference VREF. VREF is a reference voltage that determines the final write current amplitude. VREF is designed using all the same device type and current density to match to the devices and currents used in the three emitter-follower buffer stage 46 and in the H-switch 42 bottom pair i.e. R12, Q10, Q11, Q7, Q4, and Q5, etc. Therefore, programming the VREF advantageously facilitates the selective changing of write current amplitude.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A write driver circuit adapted to drive a mass media head, comprising:
    an H-switch having a pair of differential inputs and a pair of differential outputs adapted to drive the head;
    an ECL pre-driver circuit coupled to and driving said H-switch;
    a switching current mode logic boosting circuit coupled to the ECL pre-driver circuit,
    wherein the boosting circuit comprises a first pair of transistors switching a write data signal coupled to the H-switch,
    wherein the boosting circuit further comprises a second set of transistors switching a pulsing signal to create a write current coupled to the H-switch,
    wherein the boosting circuit further comprises a third set of transistors operating in conjunction with the second set of transistors to switch the pulsing signal in the opposite direction,
    wherein said ECL pre-driver circuit comprises a series of emitter-follower transistors adapted to build current and voltage drive capability to drive the H-switch, and
    wherein said first, second and third set of transistors comprise of PMOS devices.

2. The write driver circuit as specified in claim 1 wherein said ECL pre-driver circuit generates at least 60 mA steady state current.

3. The write driver circuit as specified in claim 1 wherein said ECL pre-driver circuit generates at least 150 mA transient/overshoot current.

4. A write driver circuit adapted to drive a mass media head, comprising:
    an H-switch having a pair of differential inputs and a pair of differential outputs adapted to drive the head;
    an ECL pre-driver circuit coupled to and driving said H-switch;
    a switching current mode logic boosting circuit coupled to the ECL pre-driver circuit,
    wherein the boosting circuit comprises a first pair of transistors switching a write data signal coupled to the H-switch, and
    wherein said ECL pre-driver circuit comprises a series of emitter-follower transistors adapted to build current and voltage drive capability to drive the H-switch, and
    wherein a rising edge of a pulsing signal is coincident with a falling edge of the write data signal.

5. The write driver circuit as specified in claim 4 wherein a pulse width of the pulsing signal is determined by a write data delay signal.

6. The write driver circuit as specified in claim 5 wherein a delay time of the delay signal is programmable to achieve overshoot amplitude control.

7. A write driver circuit adapted to drive a mass media head, comprising:
    an H-switch having a pair of differential inputs and a pair of differential outputs adapted to drive the head;
    an ECL pre-driver circuit coupled to and driving said H-switch;
    a switching current mode logic boosting circuit coupled to the ECL pre-driver circuit,
    wherein the boosting circuit comprises a first pair of transistors switching a write data signal coupled to the H-switch, and
    wherein said ECL pre-d river circuit comprises a series of emitter-follower transistors adapted to build current and voltage drive capability to drive the H-switch, and
    wherein the write data signal is converted into current by folding emitters of the ECL pre-driver.

8. The write driver circuit as specified in claim 7 further comprising a programmable voltage reference configured to change a write current amplitude of the H-switch.

9. A method of operating a mass media write driver circuit including an H-switch, comprising the steps of:
    driving the H-switch with an ECL pre-driver circuit to achieve increased write speeds,
    wherein said ECL pre-driver comprises a series of emitter-follower transistors boosting a current and voltage capability of the H-switch,
    further comprising the step of implementing a switching current mode logic boosting circuit coupled to the ECL pre-driver circuit,
    wherein the boosting circuit comprises a first pair of transistors switching a write data signal coupled to the H-switch,
    wherein the boosting circuit further comprises a second set of transistors switching a pulsing signal to create a write current coupled to the H-switch,
    wherein the boosting circuit further comprises a third set of transistors operating in conjunction with the second set of transistors to switch the pulsing signal in the opposite direction, and wherein said first, second and third set of transistors comprise of PMOS devices.

10. A method of operating a mass media write driver circuit including an H-switch, comprising the steps of:
   driving the H-switch with an ECL pre-driver circuit to achieve increased write speeds,
   wherein said ECL pre-driver comprises a series of emitter-follower transistors boosting a current and voltage capability of the H-switch,
   further comprising the step of implementing a switching current mode logic boosting circuit coupled to the ECL pre-driver circuit,
   wherein the boosting circuit comprises a first pair of transistors switching a write data signal coupled to the H-switch,
   wherein the boosting circuit further comprises a second set of transistors switching a pulsing signal to create a write current coupled to the H-switch,
   wherein the boosting circuit further comprises a third set of transistors operating in conjunction with the second set of transistors to switch the pulsing signal in the opposite direction, and
   wherein a rising edge of the pulsing signal is coincident with a falling edge of the write data signal.

11. The method as specified in claim 10 wherein a pulse width of the pulsing signal is determined by a write data delay signal.

12. The method as specified in claim 11 wherein a delay time of the delay signal is programmable to achieve overshoot amplitude control.

13. A method of operating a mass media write driver circuit including an H-switch, comprising the steps of:
   driving the H-switch with an ECL pre-driver circuit to achieve increased write speeds,
   wherein said ECL pre-driver comprises a series of emitter-follower transistors boosting a current and voltage capability of the H-switch,
   further comprising the step of implementing a switching current mode logic boosting circuit coupled to the ECL pre-driver circuit,
   wherein the boosting circuit comprises a first pair of transistors switching a write data signal coupled to the H-switch,
   wherein the boosting circuit further comprises a second set of transistors switching a pulsing signal to create a write current coupled to the H-switch,
   wherein the boosting circuit further comprises a third set of transistors operating in conjunction with the second set of transistors to switch the pulsing signal in the opposite direction, and
   wherein the write data signal is converted into current by folding emitters of the ECL pre-driver.

* * * * *